(12) United States Patent
Edelmeier

(10) Patent No.: US 7,264,645 B2
(45) Date of Patent: Sep. 4, 2007

(54) PLATE-SHAPED FILTER ELEMENT

(75) Inventor: Friedrich Edelmeier, Beckum (DE)

(73) Assignee: Haver & Boecker, Oelde (DE)

( * ) Notice: Subject to any disclaimer, the term of this patent is extended or adjusted under 35 U.S.C. 154(b) by 0 days.

(21) Appl. No.: 11/345,779

(22) Filed: Feb. 2, 2006

(65) Prior Publication Data

US 2006/0150600 A1    Jul. 13, 2006

Related U.S. Application Data

(63) Continuation of application No. PCT/EP2004/005237, filed on May 15, 2004.

(30) Foreign Application Priority Data

Aug. 2, 2003  (DE) .................. 203 11 945 U

(51) Int. Cl.
    *D03D 15/02* (2006.01)
(52) U.S. Cl. .............. 55/522; 55/525; 55/526; 55/527; 55/528; 55/529; 210/486; 210/499; 210/791; 139/425 A; 139/425 R; 245/2; 428/102; 428/225; 428/257; 428/258; 428/259
(58) Field of Classification Search ........ 210/486, 210/499, 791; 139/425 A, 425 R; 245/2; 428/102, 225, 257–259; 55/522, 525–529
See application file for complete search history.

(56) References Cited

U.S. PATENT DOCUMENTS

| 4,211,807 | A | * | 7/1980 | Yazawa et al. ........... 428/109 |
| 4,691,744 | A | * | 9/1987 | Haver et al. ........... 139/425 R |
| 5,256,475 | A | * | 10/1993 | Koyanagi et al. ........... 442/212 |
| 5,713,598 | A | * | 2/1998 | Morita et al. ........... 280/743.1 |
| 5,783,278 | A | * | 7/1998 | Nishimura et al. ......... 428/102 |
| 6,291,806 | B1 | * | 9/2001 | Quick et al. .............. 219/633 |
| 6,527,954 | B1 | * | 3/2003 | Furuhashi ................ 210/315 |
| 6,540,807 | B1 | * | 4/2003 | Kawaguchi et al. ......... 55/524 |
| 6,729,154 | B2 | * | 5/2004 | Takashima et al. ......... 62/317 |
| 2004/0142618 | A1 | * | 7/2004 | Porter .................... 442/266 |
| 2004/0176007 | A1 | * | 9/2004 | Braekevelt ............... 442/229 |
| 2004/0182774 | A1 | * | 9/2004 | Hirokawa et al. ....... 210/321.74 |
| 2005/0260912 | A1 | * | 11/2005 | Payne et al. ............. 442/189 |

FOREIGN PATENT DOCUMENTS

| DE | 36 18 320 A | 12/1987 |
| DE | 202 08 865 U | 8/2002 |
| DE | 202 17 294 U | 1/2003 |
| DE | 203 06 670 U | 6/2003 |

\* cited by examiner

*Primary Examiner*—Minh-Chau T. Pham
(74) *Attorney, Agent, or Firm*—Henry M. Feiereisen

(57) ABSTRACT

A plate-shaped filter element made from several wire cloth layers and having at least one layer in the form of a filter cloth is designed to allow particles of a certain size can be filtered out from a filterable material, whereby, in particular, particles can be filtered out from a fluid, an emulsion or the like. The filter element according to the invention is configured such that at least the layer forming the filter cloth is provided with spaced-apart alternating crossovers at an angle to the warp and weft threads. The alternating crossovers extend in a zigzag whereby each straight section extends across a same number of warp threads. The alternating crossovers extend from the edges which are parallel to and spaced from the warp wires. The filter element according to the invention is particularly suitable for filtering of emulsions.

21 Claims, 1 Drawing Sheet

PLATE-SHAPED FILTER ELEMENT

CROSS-REFERENCES TO RELATED APPLICATIONS

This application is a continuation of prior filed copending PCT International application no. PCT/EP2004/005237, filed May 15, 2004, which designated the United States and on which priority is claimed under 35 U.S.C. §120, and which claims the priority of German Patent Application, Serial No. 203 11 945.2, filed Aug. 2, 2003, pursuant to 35 U.S.C. 119(a)-(d), the content(s) of which is/are incorporated herein by reference.

BACKGROUND OF THE INVENTION

The present invention relates to a plate-shaped filter element made of several layers of a wire cloth.

Nothing in the following discussion of the state of the art is to be construed as an admission of prior art.

The layers forming the plate-shaped filter element typically include metallic meshes. The plate-shaped filter element could also be labeled as composite plate. Such filter elements are known in many configurations. The pore size of the filter cloth depends on the sizes of the particles being filtered. To separate particles from a material, a liquid, an emulsion or like stuff, two different processes are known. According to a first process, separation of the particles is implemented by a screening device and according to a second process by a filtering device which contains the plate-shaped filter or cloth layers.

Plate-shaped filter elements used for filtering heretofore have a filter cloth which is made exclusively from the warp wires and the weft wires extending at a right angle thereto. As a consequence, tetragonal meshes or three-dimensional triangles or interstices are created in projection. Although such filter cloths have shown their usefulness, they are not entirely satisfactory for certain applications, e.g. for filtering particles of certain size from an emulsion.

It would therefore be desirable and advantageous to provide an improved plate-shaped filter element to obviate prior art shortcomings and to allow filtering of particles of a particular size from a filterable material. In particular, particles should be filtered out from a liquid, an emulsion or the like.

SUMMARY OF THE INVENTION

According to one aspect of the present invention, a plate-shaped filter element, comprising a wire cloth made of several layers, at least one layer being a filter cloth, wherein each layer of the wire cloth and filter cloth is woven by warp wires and weft wires connected to one another, wherein the at least one layer is provided with spaced-apart alternating crossovers extending slantingly to the warp and weft wires.

The sizes of the meshes are thus no longer determined exclusively by the distances between the warp and weft wires but gussets are formed which deviate from the tetragonal configuration. The size of this gusset thus depends also on the layers of the alternating crossovers to the warp wires and weft wires. The alternating crossovers also contribute to the stabilization of the filter cloth as they also are made of wires.

According to another feature of the present invention, the alternating crossovers may extend in the shape of a zigzag, with each straight section extending across a constant number of warp wires. The zigzag course of the alternating crossovers further enhances stability so that it can be assumed that the service life of the filter element is increased compared to conventional designs. Suitably, the alternating crossovers extend from the edges oriented in parallel and spaced-apart relationship to the warp wires. As each straight section of the zigzag-shaped alternating crossovers extends across a constant number of warp wires, a same mesh size is realized across the entire filter area.

According to another feature of the present invention, the straight sections of the alternating weft wires may extend across twenty warp wires at a maximum.

According to another feature of the present invention, the warp and weft wires may be woven by a ZZ-special weave. As a result, beneficial conditions are realized for the weaves of the alternating crossovers. A currently preferred design involves a change in side of the warp wires, when the latter extends over a certain number of weft wires and this number corresponds to the number of warp wires that the weft wires extends above.

According to another feature of the present invention, the number of warp wires below the weft may be two pieces respectively. The respectively disposed on a side form each two pieces. The respective sections of the warp and weft threads on one side are placed from warp wire to warp wire at an offset to the weft wire. The sections of the weft wires on one side are also positioned at an offset which is a warp wire from weft wire to weft wire. The diameters of the warp wires and the weft wires may correspond depending on the design but may also vary. The diameters of the wires forming the alternating crossovers may correspond to the diameters of the weft wires or also deviate therefrom. Constructions are, however, also conceivable in which the wires, which form the alternating crossovers, have diameters which deviate from the diameters of the warp wires and weft wires. Regardless of the configurations, it is provided to extend the wires, which form the alternating crossovers, at an angle of 45° to the warp wires and to the weft wires. The wires, which form the alternating crossovers, then extend across the same number of warp and weft wires. Certain applications may require the plate-shaped filter element to include a protective mesh, which is associated to the filter cloth, for protection of the filter cloth. It may also be necessary to provide a support mesh for the plate-shaped filter element for stabilization. It may hereby be suitable to correspond the type of weave of the protective and support meshes to the type of weave of the filter cloth. The mesh width of the protective mesh is preferably greater than the mesh width of the filter cloth. Further application may require equipping the plate-shaped filter element with a drainage mesh. As a result, the quantitative filtering capacity is optimized.

The plate-shaped filter elements involved here are to be considered as fine-meshed. The metallic wire fabric layers are connected together by diffusion. The plate-shaped filter elements involved here are placed in filter plates and cylindrical filters and are especially appropriate for one-sided load. The layer forming the filter cloth is woven preferably by the weave BMT-ZZ.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
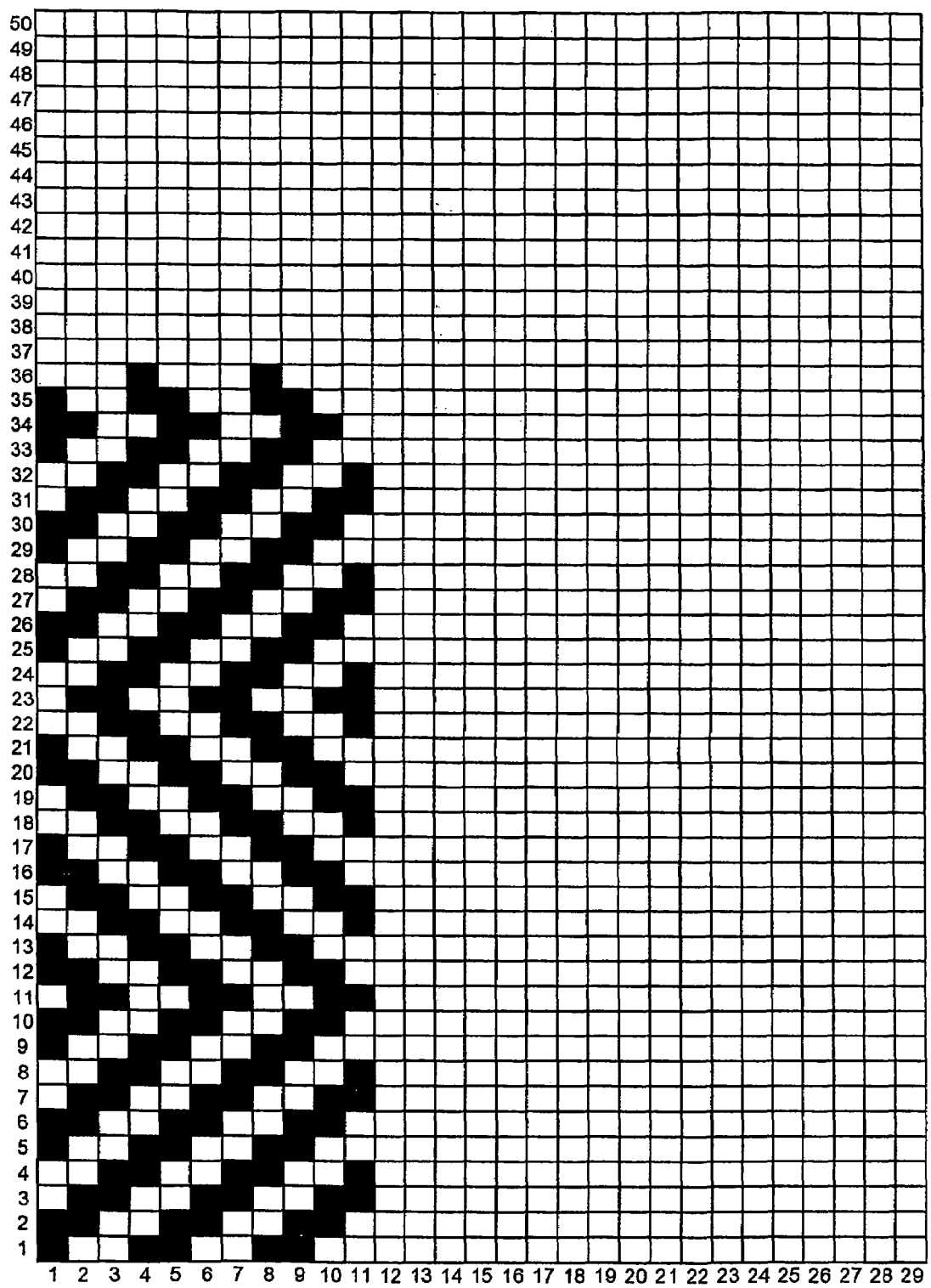
FIG. 1 is an exemplified weave pattern according to the present invention.

The depicted embodiment is to be understood as illustrative of the invention and not as limiting in any way. It should also be understood that the drawings are not necessarily to scale and that embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now FIG. 1, there is shown an exemplified weave pattern according to the ZZ weave (dutch twill weave), whereby the vertical lines of squares represent warp wires, i.e. the course of the warp wires is in the downward direction, while the horizontal lines represent weft wires, i.e. the course of the weft wires extends from left to right. A filled-in square indicates that the weft wire it represents is above the warp wire, and a blank space represents warp wire above weft wire.

A filter cloth has weft wires extending above a certain number of warp wires. Then, a change to the other side takes place so that again the weft wires extend over a certain number of warp wires, wherein the number for each side is the same or different. The twill lines as defined by the change of the weft wires to the other side thus extend precisely as the warp wires. As shown in FIG. 1, the weft wire no. 1 extends underneath the warp wires no. 2 and 3, then a change takes place with the weft wire extending above warp wires nos. 4, 5, and so forth.

The weft wire no. 2 extends above the warps nos. 1, 2, then the change takes place and the weft wire no. 2 extends underneath the warp wires nos. 3, 4, and so forth. As a result, an offset by one warp wire is realized from left to right. The number of warp wires to define the offset may, of course, be greater. The offset from left to right continues until the weft wire no. 11, before a reversal takes place, i.e. the offset occurs from right to left.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A plate-shaped filter element, comprising a wire cloth made of several layers, at least one layer being a filter cloth, wherein each layer of the wire cloth and filter cloth is woven by warp wires and weft wires connected to one another, wherein the at least one layer is provided with spaced-apart alternating crossovers extending slantingly to the warp and weft wires.

2. The plate-shaped filter element of claim 1, wherein the alternating crossovers extend in the shape of a zigzag, with each straight section extending across a constant number of warp wires.

3. The plate-shaped filter element of claim 2, wherein the alternating crossovers extend from an edge region of the plate-shaped filter element, said edge region oriented in parallel and spaced-apart relationship to the warp wires.

4. The plate-shaped filter element of claim 2, wherein each straight section of each alternating crossover extends across a constant number of warp wires.

5. The plate-shaped filter element of claim 1, wherein the warp and weft wires are woven by a ZZ-special weave.

6. The plate-shaped filter element of claim 1, wherein a change in side of the warp wires is implemented when a certain number of weft wires are below a warp wires, wherein the number of warp above weft and weft above warp is identical.

7. The plate-shaped filter element of claim 6, wherein the number of warp wires above the weft wires amounts to two warp wires.

8. The plate-shaped filter element of claim 1, wherein sections of the warp and weft wires on one side of the plate-shaped filter element extend at an offset to one weft wire from warp wire to warp wire.

9. The plate-shaped filter element of claim 1, wherein sections of the weft wires on one side of the plate-shaped filter element extend at an offset relationship which amounts to a warp wire from weft wire to weft wire.

10. The plate-shaped filter element of claim 1, wherein the warp wires are defined by a diameter which corresponds or at least approximates a diameter of the weft wires.

11. The plate-shaped filter element of claim 1, wherein the warp wires are defined by a diameter which differs from a diameter of the weft wires.

12. The plate-shaped filter element of claim 1, wherein the alternating crossovers are formed by wires which are defined by a diameter which corresponds or approximates a diameter of the weft wires and/or warp wires.

13. The plate-shaped filter element of claim 1, wherein the alternating crossovers are formed by wires which extend at an angle of 45° to the warp wires and the weft wires.

14. The plate-shaped filter element of claim 1, further comprising a protective mesh which is associated to the at least one layer.

15. The plate-shaped filter element claim 1, further comprising a layer of a support mesh.

16. The plate-shaped filter element of claim 14, wherein the protective mesh is woven by a weave pattern which corresponds to a weave pattern of the filter cloth.

17. The plate-shaped filter element of claim 15, wherein the support mesh has a mesh width which is greater than a mesh width of the filter cloth.

18. The plate-shaped filter element of claim 1, further comprising a drainage mesh.

19. The plate-shaped filter element of claim 2, wherein each straight section of each alternating crossover extends across a maximum of twenty warp wires.

20. The plate-shaped filter element of claim 1, wherein the alternating crossovers are formed by wires which are defined by a diameter which deviates from a diameter of the weft wires and/or warp wires.

21. The plate-shaped filter element of claim 15, wherein the support mesh is woven by a weave pattern which corresponds to a weave pattern of the filter cloth.

* * * * *